United States Patent
Kung

(10) Patent No.: US 9,027,906 B2
(45) Date of Patent: May 12, 2015

(54) FILLER ASSEMBLY FOR A VALVE

(71) Applicant: Wan-Rong Kung, Kaohsiung (TW)

(72) Inventor: Wan-Rong Kung, Kaohsiung (TW)

( * ) Notice: Subject to any disclaimer, the term of this patent is extended or adjusted under 35 U.S.C. 154(b) by 125 days.

(21) Appl. No.: 13/792,445

(22) Filed: Mar. 11, 2013

(65) Prior Publication Data

US 2014/0197342 A1 Jul. 17, 2014

(30) Foreign Application Priority Data

Jan. 17, 2013 (TW) .............................. 102201088 U

(51) Int. Cl.
*F16J 15/24* (2006.01)
*F16K 41/02* (2006.01)
*F16J 15/18* (2006.01)
*F16J 15/26* (2006.01)

(52) U.S. Cl.
CPC .............. *F16K 41/02* (2013.01); *F16J 15/184* (2013.01); *F16J 15/24* (2013.01); *F16J 15/26* (2013.01)

(58) Field of Classification Search
CPC .......... F16J 15/189; F16J 15/20; F16J 15/26; F16J 15/184; F16J 15/24; F16K 1/2268; F16K 3/243; F16K 5/0694; F16K 41/026; F16K 41/00; F16K 41/02; F16K 41/023; F16K 41/043; F16K 41/063; F16K 41/046
USPC ........... 251/214; 277/511, 530, 531, 539, 541
See application file for complete search history.

(56) References Cited

U.S. PATENT DOCUMENTS

| | | | | |
|---|---|---|---|---|
| 511,734 A * | 12/1893 | Hoffstadt | ....................... | 277/530 |
| 1,502,734 A * | 7/1924 | Martin | .......................... | 251/214 |
| 2,285,319 A * | 6/1942 | Wheeler | ....................... | 277/530 |
| 3,098,660 A * | 7/1963 | Hausner | ........................ | 277/530 |
| 4,082,300 A * | 4/1978 | Harbeck et al. | ................ | 277/530 |
| 4,327,923 A * | 5/1982 | Chesterton et al. | ........... | 277/531 |
| 4,363,465 A * | 12/1982 | Morrill | .......................... | 251/214 |
| 4,643,440 A * | 2/1987 | Massey, Jr. | .................... | 277/530 |
| 5,806,858 A * | 9/1998 | Harrelson, III | ............... | 277/537 |
| 5,927,685 A * | 7/1999 | Gosling | ......................... | 251/214 |
| 6,182,974 B1 * | 2/2001 | Harrelson, III | ............... | 277/537 |
| 7,665,738 B2 * | 2/2010 | Yamauchi et al. | ............. | 277/328 |
| 8,453,558 B2 * | 6/2013 | Blue | ........................... | 92/165 R |

FOREIGN PATENT DOCUMENTS

WO   WO 2011134400 A1 * 11/2011

* cited by examiner

*Primary Examiner* — Matthew W Jellett
(74) *Attorney, Agent, or Firm* — Alan D. Kamrath; Kamrath IP Lawfirm, P.A.

(57) ABSTRACT

A filler assembly is mounted in an axial hole of a cap of a valve. The filler assembly includes at least one first filler and at least one second filler stacked in a longitudinal direction. A valve rod received in the axial hole extends through the at least one first filler and the at least one second filler. At least one of two mutually abutting faces respectively of the at least one first filler and the at least one second filler is at a non-parallel angle to a radial direction perpendicular to the longitudinal direction. If one of the at least one first filler and the at least one second filler is subjected to a pressing force in the longitudinal direction, at least one of the at least one first filler and the at least one second filler is moved in the radial direction to press against the valve rod.

12 Claims, 9 Drawing Sheets

FILLER ASSEMBLY FOR A VALVE

BACKGROUND OF THE INVENTION

The present invention relates to a filler assembly and, more particularly, to a filler assembly for a valve.

A valve is generally used in pipes to control opening or closing of a fluid passage in the pipes conveying a fluid. When the components of the valve malfunction due to corrosion by the fluid in the pipes or due to aging, maintenance of the valve is required to avoid loss resulting from leakage of the fluid.

FIG. 1 shows a conventional valve 10 including a body 12, a cap 14, and a top seat 16 mounted on top of the cap 14. The body 12 includes an inlet 17 and an outlet 18 for connection with pipes conveying a fluid. A chamber 19 is formed in a top portion of body 12. A valve rod 20 includes a lower end 22 extending into the chamber 19 and connected to a plug 24. A hand wheel 28 is mounted to an upper end 26 of the valve rod 20. A sleeve 29 is provided in a center of the hand wheel 28 and receives the upper end 26 of the valve rod 20. The sleeve 29 is fixed by a fastener 30 to the top seat 16. When a user rotates the hand wheel 28, the valve rod 20 and the plug 24 move upward or downward to open or close the fluid passage between the inlet 17 and the outlet 18. The cap 14 is fixed by screws 31 to the top portion of the body 12. A pressing block 32 is mounted on top of the cap 14. Fillers 34 are mounted in the cap 14 and sandwiched by bushings 36 on upper and lower sides of the fillers 34. When two nuts engaged on two tightening bolts 38 are rotated to press against the fillers 34 via the pressing block 32 and the upper bushing 36, the fillers 34 seal a gap between the valve rod 20 and the cap 14, avoiding leakage of the fluid via the chamber 19.

However, the fillers 34 in the cap 14 are liable to damage during operation, requiring frequent replacement of the fillers 34. The fillers 34 are generally made of asbestos, are generally C-shaped in cross section, and have an opening to allow replacement of the fillers 34 without stopping the machine. After removing the damaged fillers 34 from the cap 14, new fillers 34 can be mounted around the valve rod 20 into the cap 14 via the opening of each filler 34 without the need for mounting through the upper end 26 of the valve rod 20. However, the openings of the fillers 34 adversely affect the sealing function of the fillers 34 and make the fillers 34 vulnerable. Furthermore, the fillers 34 made of asbestos can not provide a satisfactory sealing function for preventing leakage of the fluid via the gap between the valve rod 20 and the cap 14.

BRIEF SUMMARY OF THE INVENTION

An objective of the present invention is to provide a filler assembly for a valve to prevent leakage of the fluid via a gap between a valve rod and a cap of the valve.

Another objective of the present invention is to provide a filler assembly including a plurality of annular fillers to prolong the service life of the fillers while having a simple structure.

A filler assembly according to the present invention is mounted in a valve including a body, a cap mounted to a top portion of the body and having an axial hole, and a valve rod extending through the axial hole of the cap. The filler assembly is adapted to be mounted in the axial hole of the cap. The filler assembly is adapted to seal a gap between the valve rod and an inner periphery of the axial hole. The filler assembly includes at least one first filler and at least one second filler. The at least one first filler includes upper and lower faces spaced from each other in a longitudinal direction. A first through-hole extends from the upper face through the lower face of the at least one first filler. The valve rod is adapted to extend through the first through-hole. The at least one second filler includes top and bottom faces spaced from each other in the longitudinal direction. A second through-hole extends from the top face through the bottom face of the at least one second filler. The valve rod is adapted to extend through the second through-hole. The at least one second filler and the at least one first filler are stacked upon each other and include two mutually facing and mutually abutting faces comprised of one of the upper and lower faces of the at least one first filler and one of the top and bottom faces of the at least one second filler. At least one of the two mutually facing and mutually abutting faces is a slant face at a non-parallel angle to a radial direction perpendicular to the longitudinal direction. If one of the at least one first filler and the at least one second filler is subjected to a pressing force in the longitudinal direction, at least one of the at least one first filler and the at least one second filler is moved in the radial direction to press against an outer periphery of the valve rod.

The present invention will become clearer in light of the following detailed description of illustrative embodiments of this invention described in connection with the drawings.

DETAILED DESCRIPTION OF THE INVENTION

Figure 1:
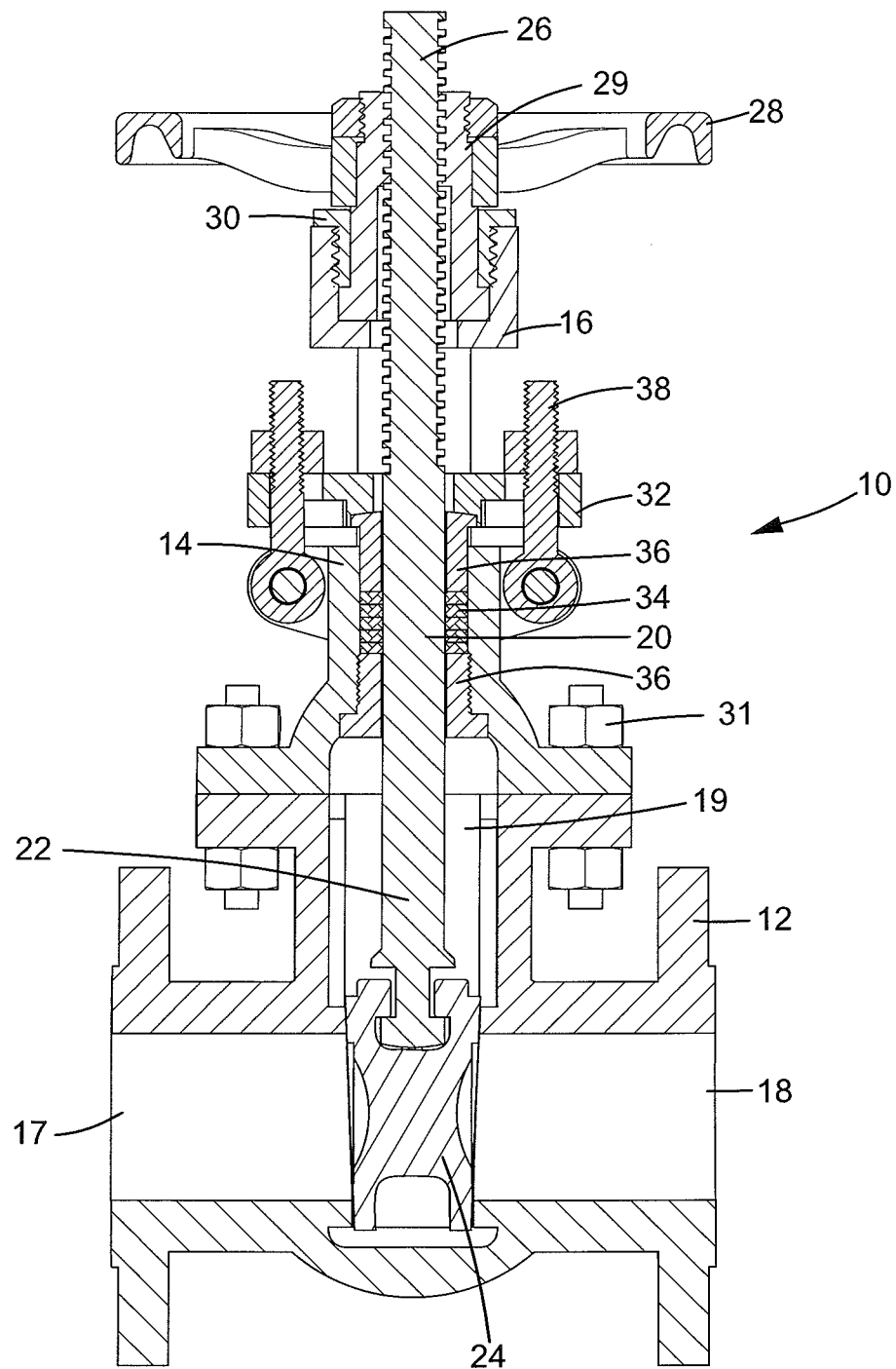
FIG. 1 shows a cross sectional view of a conventional valve.
Figure 2:
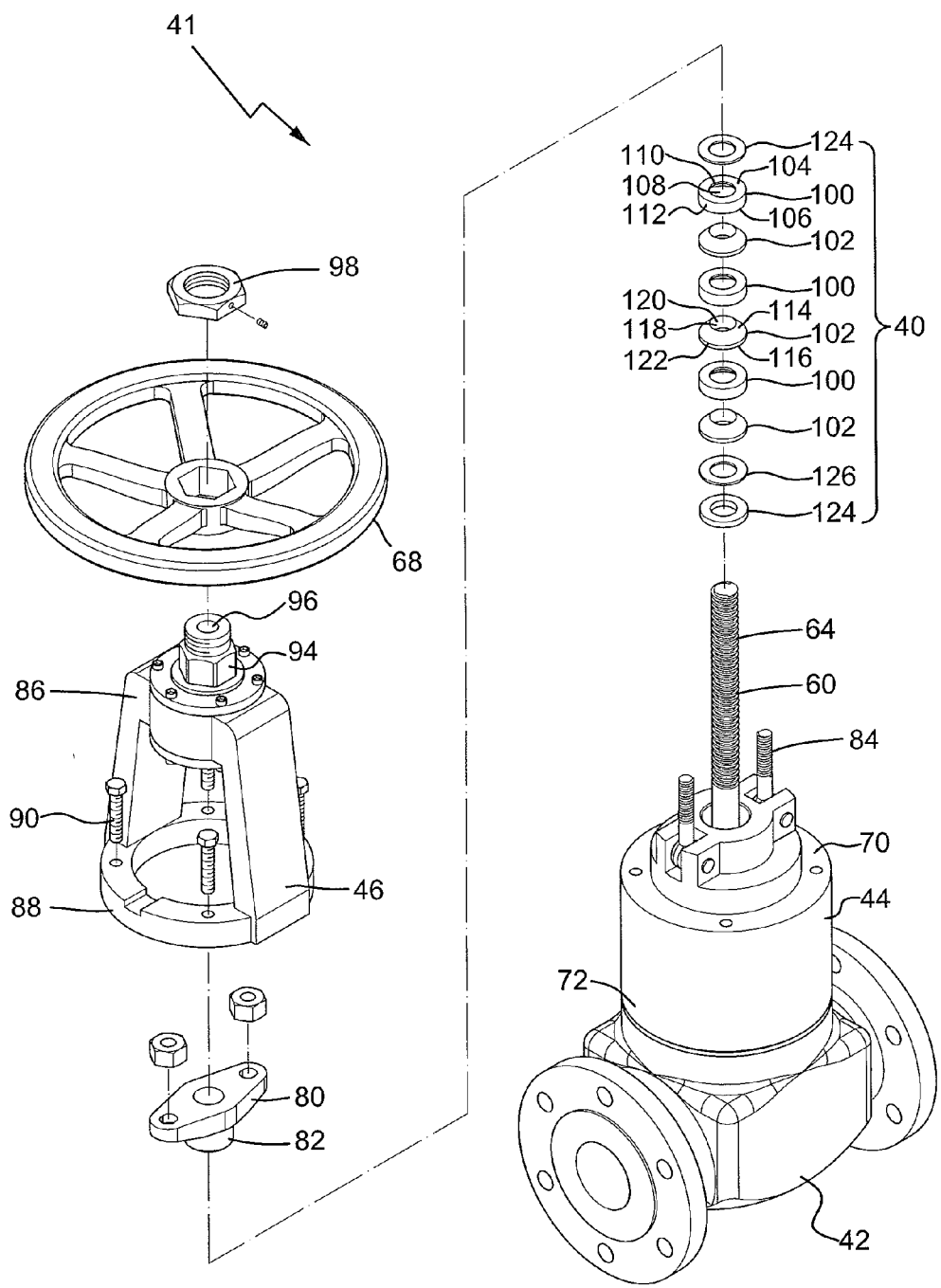
FIG. 2 shows an exploded, perspective view of a valve including a filler assembly of a first embodiment according to the present invention.
Figure 3:
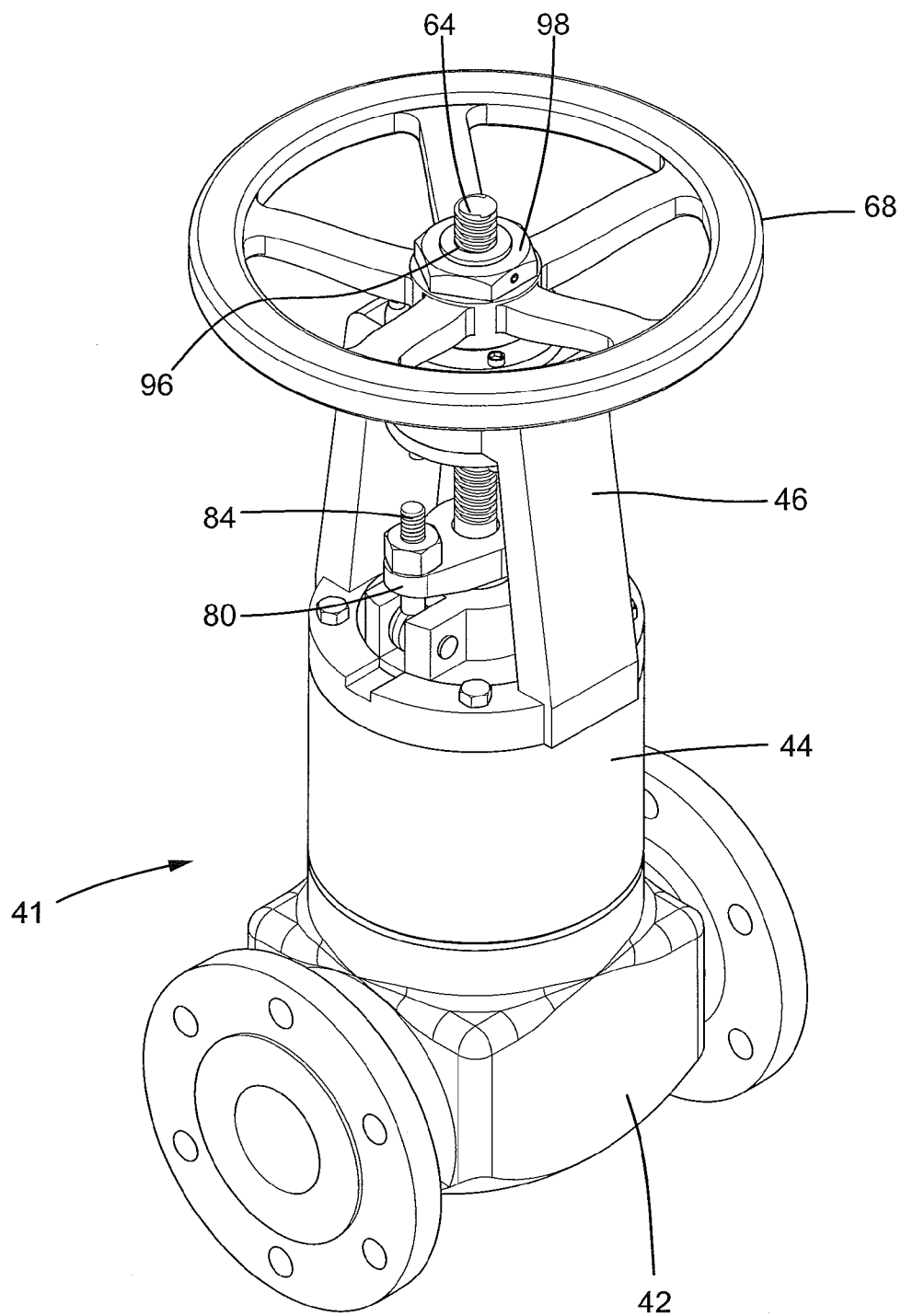
FIG. 3 shows a perspective view of the valve of FIG. 2.
Figure 4:
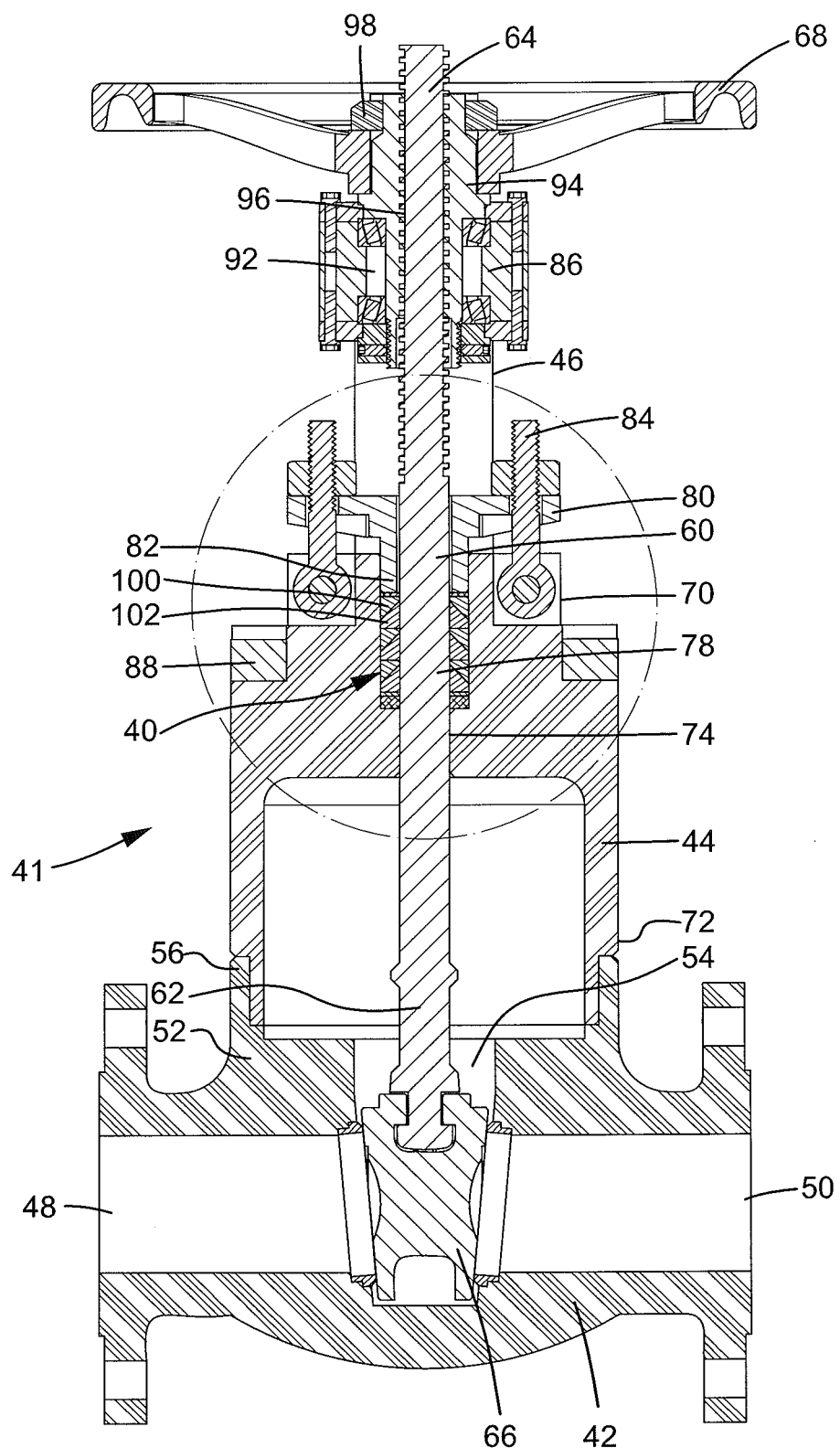
FIG. 4 shows a cross sectional view of the valve of FIG. 3.
Figure 5:
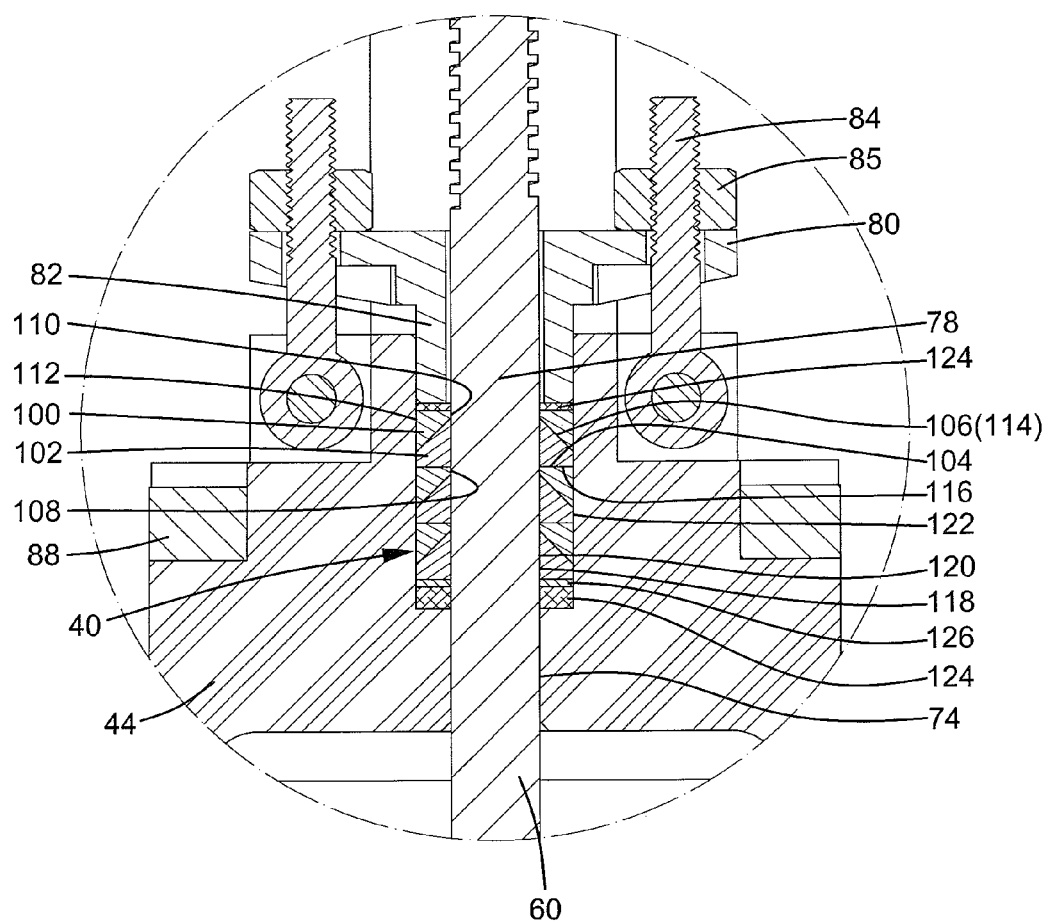
FIG. 5 shows an enlarged view of a circled portion of FIG. 4.

With reference to FIGS. 2-4, a filler assembly 40 of a first embodiment according to the present invention is used in a valve 41 including a body 42, a cap 44, and a top cover 46 removably mounted to the cap 44. The body 42 includes an inlet 48 and an outlet 50 for connection with pipes. A chamber 54 is formed in a top portion 52 of the body 42 and in communication with a fluid passage between the inlet 48 and the outlet 50. A connecting portion 56 extends upward from the top portion 52 of the body 42. A valve rod 60 includes a lower end 62 and an upper end 64 spaced from the lower end 62 in a longitudinal direction. The lower end 62 of the valve rod 60 extends into the chamber 54 and is connected to a plug 66. The upper end 64 of the valve rod 60 has a thread. A hand wheel 68 is mounted to the upper end 64 of the valve rod 60.

The cap 44 is mounted to the top portion 52 of the body 42 and includes a top end 70 and a bottom end 72 spaced from the top end 70 in the longitudinal direction. The cap 44 further includes an axial hole 74 extending from the top end 70 through the bottom end 72 in the longitudinal direction. The axial hole 74 has an enlarged lower section in the form shown in FIG. 4. A lower end at the enlarged lower section of the axial hole 74 is in communication with the chamber 54. The bottom end 72 of the cap 44 is engaged with the connecting portion 56 of the body 42. An intermediate portion 78 of the valve rod 60 extends through the axial hole 74 of the cap 44.

The filler assembly 40 is mounted in the axial hole 74 of the cap 44 and between the intermediate portion 78 of the valve rod 60 and an inner periphery of the axial hole 74 of the cap 44 to seal a gap between the valve rod 60 and the inner periphery of the axial hole 74.

A pressing block 80 is mounted on the top end 70 of the cap 44. The pressing block 80 includes a cylindrical lower section 82 inserted into the axial hole 74 of the cap 44. Two tightening bolts 84 are extended through the pressing block 80. A nut 85 is mounted on each tightening bolt 84 and abuts the pressing block 80. When the nuts 85 on the tightening bolts 84 are rotated in a tightening direction, the lower section 82 of the pressing block 80 presses against the filler assembly 44, such that the filler assembly 44 seals the gap between the valve rod 60 and the cap 44.

The top cover 46 includes top and bottom portions 86 and 88 spaced from each other in the longitudinal direction. The bottom portion 88 of the top cover 46 is fixed by screws 90 to the top end 70 of the cap 44. The upper end 64 of the valve rod 60 extends through the top cover 46. The top portion 86 of the top cover 46 is located adjacent to the hand wheel 68. A compartment 92 is formed in the top portion 86 of the top cover 46 and receives a sleeve 94. The sleeve 94 includes a screw hole 96. The upper end 64 of the valve rod 60 extends through and is threadedly engaged with the screw hole 96 of the sleeve 94. An upper end of the sleeve 94 extends beyond the top cover 46 and the hand wheel 68. A retaining ring 98 is mounted around the upper end of the sleeve 94 to retain the sleeve 94. When the hand wheel 68 rotates, the sleeve 94 rotates freely in the compartment 92 of the top cover 46, and the valve rod 60 and the plug 66 move upward or downward to open or close the fluid passage in the body 42.

The filler assembly 40 includes at least one first filler 100 and at least one second filler 102. In the embodiment shown in FIG. 4, the filler assembly 40 includes three first fillers 100 and three second fillers 102. At least one of two mutually facing faces respectively of one of the first fillers 100 and one of the second fillers 102 is an arcuate or slant face at a non-parallel angle to a radial direction perpendicular to the longitudinal direction. Each first filler 100 is an annular ring made of metal, such as iron. Each first filler 100 includes an upper face 104, a lower face 106, and a first through-hole 108 extending from the upper face 104 through the lower face 106. The upper face 104 is a flat face, and the lower face 106 is a slant face. The valve rod 60 extends through the first through-hole 108 of each first filler 100. Each first filler 100 further includes an outer periphery 112 spaced from an inner periphery 110 of the first through-hole 108 in a radial direction. Each second filler 102 is an annular ring made of graphite. Each second filler 102 includes a top face 114, a bottom face 116, and a second through-hole 118 extending from the top face 114 through the bottom face 116. The top face 114 is a slant face corresponding to the lower face 106 of each first filler 100, and the bottom face 116 is a flat face. The valve rod 60 extends through the second through-hole 118 of each second filler 102. Each second filler 102 further includes an outer periphery 122 spaced from an inner periphery 120 of the second through-hole 118 in a radial direction.

The first and second fillers 100 and 102 are alternately mounted in the axial hole 74 of the cap 44 in a stack, with each second filler 102 located between two adjacent first fillers 100. The lower face 106 of each first filler 100 between two adjacent second fillers 102 abuts the top face 114 of the lower one of the two adjacent second fillers 102. The upper face 104 of each first filler 100 between two adjacent second fillers 102 abuts the bottom face 116 of the upper one of the two adjacent second fillers 102. The top face 114 of each second filler 102 abuts the bottom face 106 of one of the first fillers 100 above it. The bottom face 116 of each second filler 102 abuts the upper face 104 of one of the first fillers 100 below it.

The filler assembly 40 can further include upper and lower bushing rings 124 made of asbestos and a washer 126 made of metal. The first and second fillers 100 and 102 are mounted between the upper and lower bushing rings 124. The washer 126 is, mounted between the bottommost second filler 102 and the lower bushing ring 124.

In assembly, the intermediate portion 78 of the valve rod 60 extends through the first through-holes 108 of the first fillers 100 and the second through-holes 118 of the second fillers 102. The outer periphery 112 of each first filler 100 and the outer periphery 122 of each second filler 102 are adjacent to the inner periphery of the axial hole 74. The lower section 82 of the pressing block 80 presses against the top end of the filler assembly 40. In the embodiment shown in FIG. 4, the lower section 82 of the pressing block 80 is located on top of the upper bushing ring 124.

The filler assembly 40 according to the present invention provides an enhanced sealing function for the valve 41 to avoid the fluid from leaking through the gap between the valve rod 60 and the cap 44. Specifically, when the nuts 85 on the tightening bolts 84 are rotated to press against the filler assembly 40 in the longitudinal direction via the pressing block 80, since the top face 114 of each second filler 102 is a slant face abutting the slant lower face 106 of each first filler 100, the first and second fillers 100 and 102 are subjected to a pressure in the radial direction perpendicular to the longitudinal direction, such that the inner periphery 110 of each first filler 100 and the inner periphery 120 of each second filler 102 will tightly press against an outer periphery of the valve rod 60. Furthermore, the outer periphery 112 of each first filler 100 and the outer periphery 122 of each second filler 102 will tightly press against the inner periphery of the axial hole 74. Thus, the gap between the valve rod 60 and the cap 44 is completely sealed. Further, each of the first and second fillers 100 and 102 is free of openings and, thus, has a service life longer than conventional C-shaped fillers. It can be appreciated that each first filler 100 can include an arcuate lower face 104 at a non-parallel angle to the radial direction, and each second filler 102 can include an arcuate top face 114 corresponding to and abutting the arcuate lower face 104 of each first filler 100.

Figure 6:
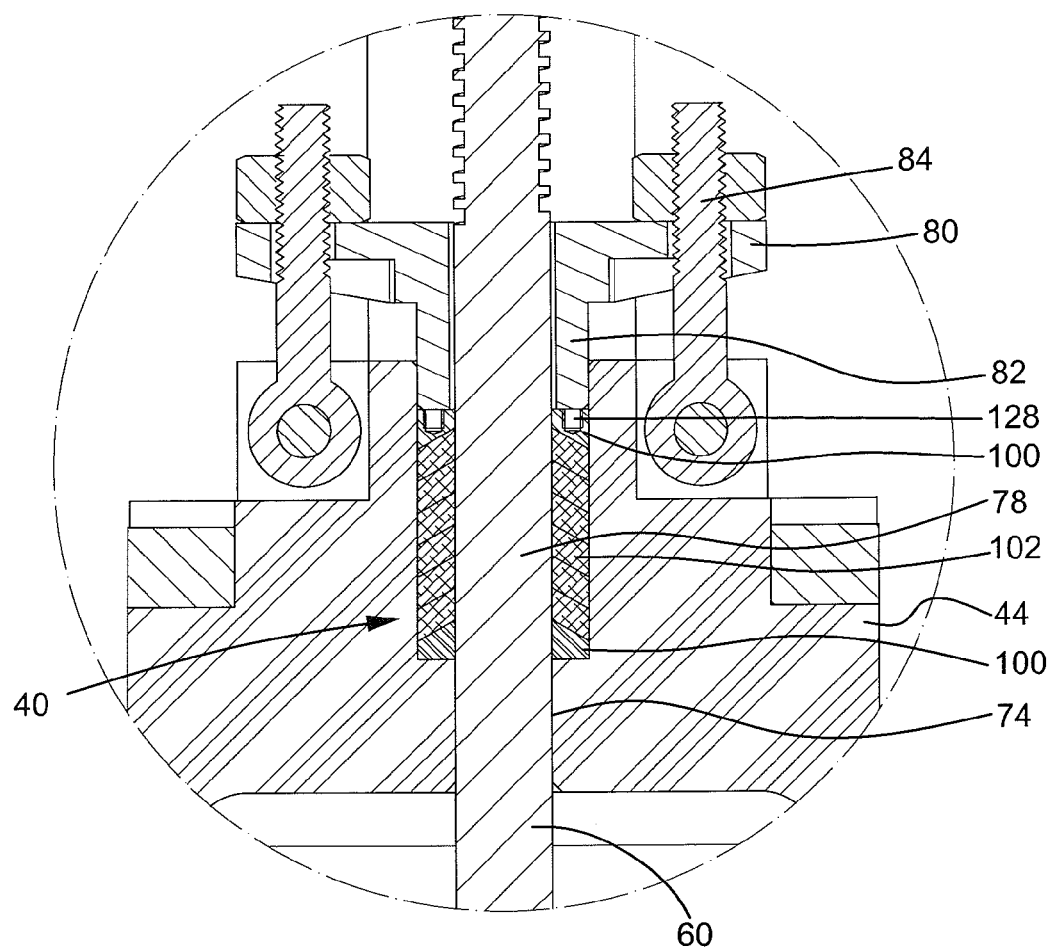
FIG. 6 is a view similar to FIG. 5, illustrating a filler assembly of a second embodiment according to the present invention.

FIG. 6 shows a filler assembly 40 of a second embodiment according to the present invention. The filler assembly 40 includes a first filler 100 and a plurality of second fillers 102 mounted below the first filler 100. The upper face 104 of the first filler 100 is flat, and the lower face 106 of the first filler 100 is slanted. The top face 114 and the bottom face 116 of each second filler 102 are slanted and have a slope corresponding to the bottom face 106 of the first filler 100. Note that the filler assembly 40 in this embodiment includes another first filler 100 below the bottommost second filler 102 and having a slant top face 104 corresponding to the slant bottom face 116 of the bottommost second filler 102 and a flat bottom face 106. The lower section 82 of the pressing block 80 presses against the upper face 104 of the first filler 100.

Furthermore, a plurality of screw holes 128 is formed in the upper face 104 of the first filler 100. In a case that the first filler 100 and/or the second fillers 102 are damaged, the cap 44 is detached, and a tool is inserted into one of the screw holes 128 to remove the first filler 100 and the second fillers 102 for replacement. The lower first filler 100 can be replaced by a bushing ring or washer. Furthermore, the first filler 100 (the upper one) can include an arcuate lower face at a non-parallel angle to the radial direction, and each second filler 102 can include arcuate top and bottom faces 114 and 116 corresponding to the arcuate lower face 106 of the first filler 100.

Figure 7:
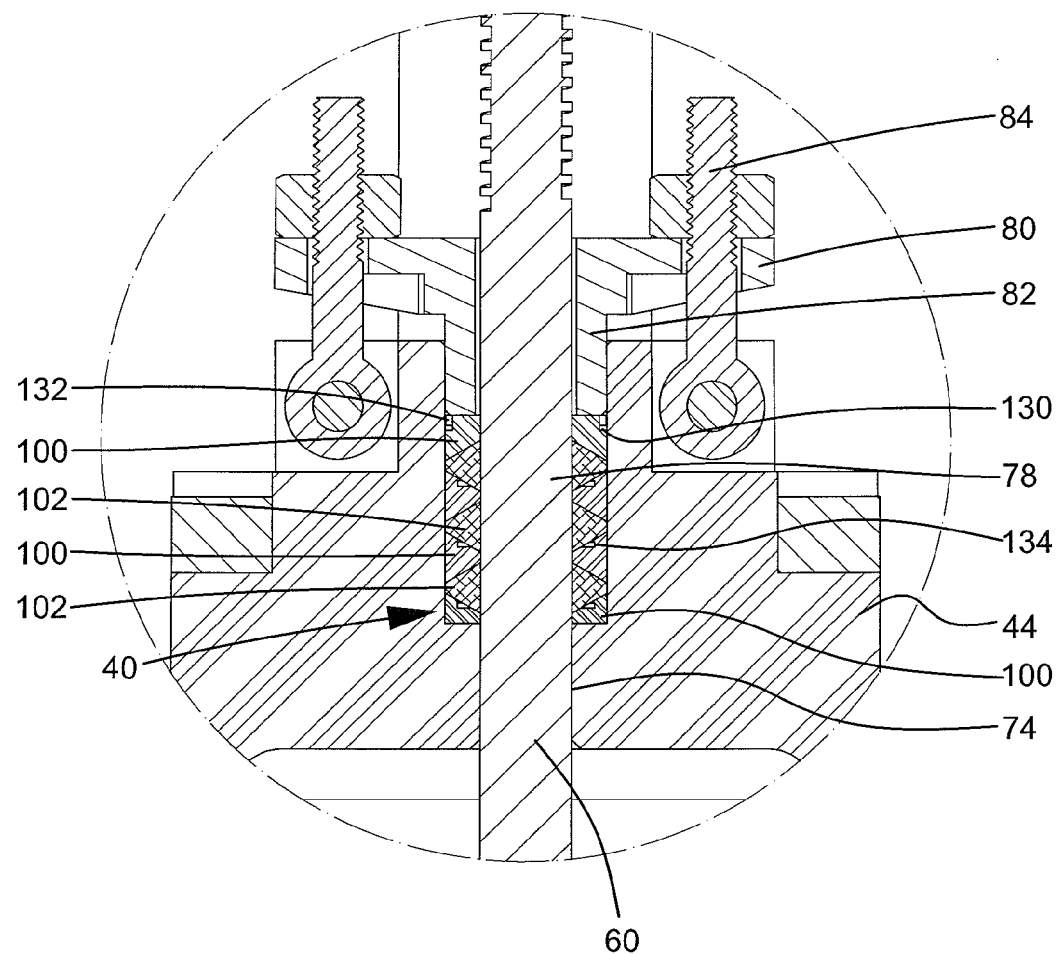
FIG. 7 is a view similar to FIG. 5, illustrating a filler assembly of a third embodiment according to the present invention.
Figure 7A:
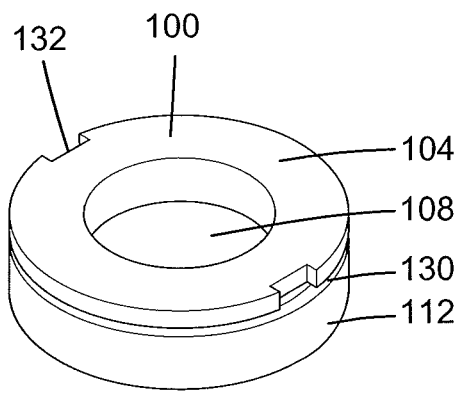
FIG. 7A is a perspective view of an example of a first filler.
Figure 7B:
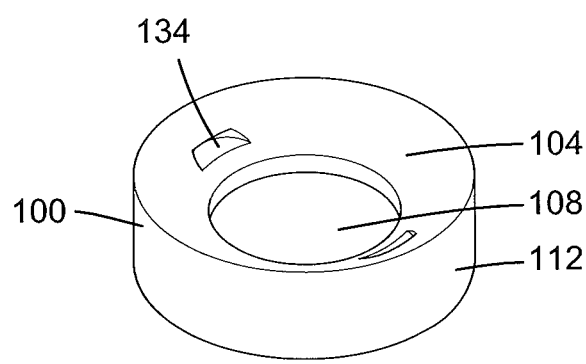
FIG. 7B is a perspective view of another example of the first filler.

FIG. 7 shows a filler assembly 40 of a third embodiment according to the present invention. In this embodiment, the first assembly 40 includes a plurality of first fillers 100 and a plurality of second fillers 102 mounted in the axial hole 74 of the cap 44. Each second filler 102 is located between two adjacent first fillers 100. Each of two mutually facing faces respectively of one of the first fillers 100 and one of the second fillers 102 is an arcuate or slant face at a non-parallel angle to the radial direction. In this embodiment, each second filler 102 includes a slant top face 114 abutting a slant bottom face 106 of one of the first fillers 100 located above the second filler 102. Each second filler 102 further includes a slant bottom face 116 abutting a slant upper face 104 of one of the first fillers 100 located below the second filler 102. One of the slant top and bottom faces 114 and 116 of each second filler 102 has a positive slope, and the other of the slant top and bottom faces 114 and 116 of each second filler 102 has a negative slope. The topmost first filler 100 has a flat upper face 104. The slant upper or lower face 104, 106 of each first filler 100 abutting an associated top or bottom face 114, 116 of a corresponding second filler 102 has a slope corresponding to the positive slope or the negative slope. Furthermore, in an example shown in FIG. 7A, an annular groove 130 is defined in the outer periphery of the first filler 100 and at least one notch 132 in the upper face 104 thereof and in communication with the annular groove 130. In another example shown in FIG. 7B, at least one recess 134 is defined in the upper face of the first filler 100. Note that the topmost first filler has a flat upper face 104 and a slant lower face 106, and the bottommost first filler 100 has a slant upper face 104 and a flat bottom face 106. When replacement of the first fillers 100 and/or the second fillers 102 is required, a tool can be inserted into the one of the annular grooves 130 or the recesses 134 to remove the damaged first or second filler 100, 102.

Figure 8:
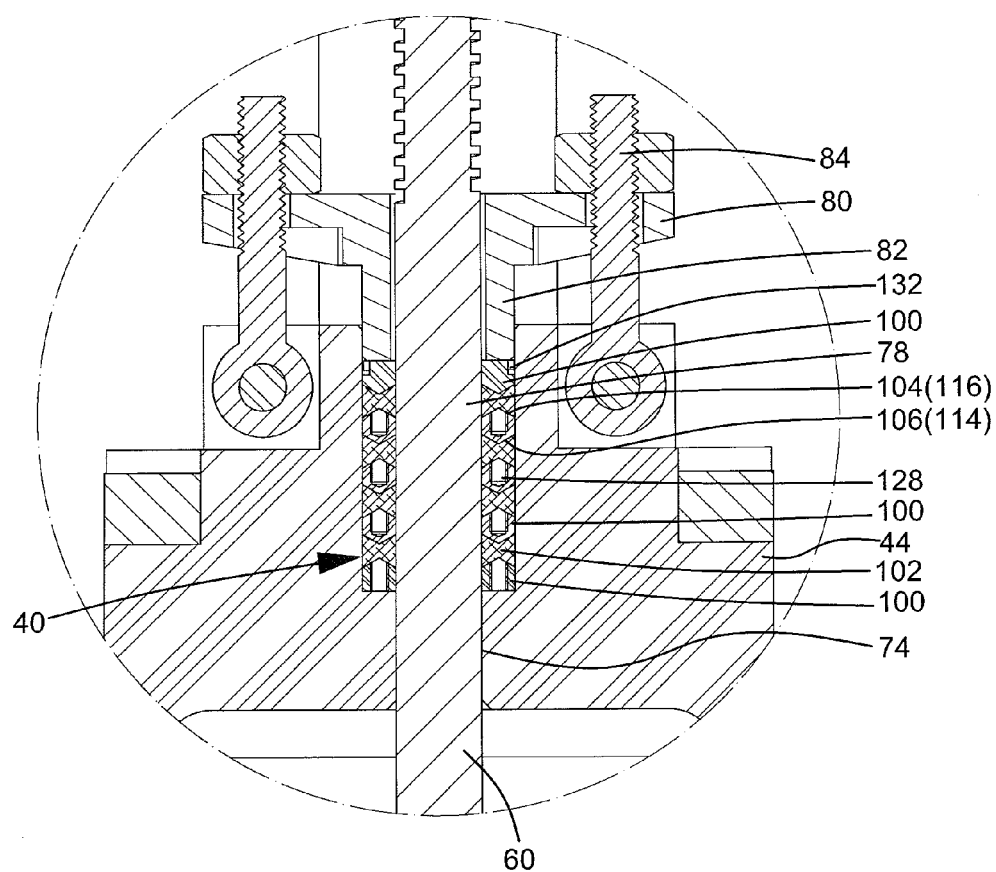
FIG. 8 is a view similar to FIG. 5, illustrating a filler assembly of a fourth embodiment according to the present invention.

FIG. 8 shows a filler assembly 40 of a fourth embodiment according to the present invention. In this embodiment, the first assembly 40 includes a plurality of first fillers 100 and a plurality of second fillers 102 mounted in the axial hole 74 of the cap 44. Each second filler 102 is located between two adjacent first fillers 100. Each of two mutually facing faces respectively of one of the first fillers 100 and one of the second fillers 102 is an arcuate or slant face at a non-parallel angle to the radial direction. Furthermore, a groove is formed in each of the top and bottom faces 114 and 116 of each second filler 102. The groove in the top face 114 has substantially V-shaped cross sections. The groove in the bottom face 116 has substantially inverted V-shaped cross sections. Except the topmost and bottommost first fillers 100, each first filler 100 has a conic top face 104 received in the groove of a corresponding second filler 102 above it and a conic bottom face 106 received in the groove of a corresponding second filler 102 below it. The bottommost first filler 100 has a flat bottom face 106 and a conic top face 104. The topmost first filler 100 has a flat top face 104 and a conic bottom face 106. Except the topmost first filler 100, a plurality of screw holes 128 is formed in the conic top face 104 of each first filler 100 below the topmost filler 100.

When the nuts 85 engaged on the pressing bolts 84 are rotated to press against the filler assembly 40 via the pressing block 80, the first and second fillers 100 and 102 are subjected to a pressure in the radial direction perpendicular to the longitudinal direction. The inner peripheries 110 and 120 of the first and second fillers 100 and 102 tightly press against the valve rod 60. Furthermore, the outer peripheries 112 and 122 of the first and second fillers 100 and 102 tightly press against the inner periphery of the axial hole 74, sealing the gap between the valve rod 60 and the cap 44.

Although specific embodiments have been illustrated and described, numerous modifications and variations are still possible without departing from the scope of the invention. The scope of the invention is limited by the accompanying claims.

The invention claimed is:

1. A filler assembly for a valve, with the valve including a body, a cap mounted to a top portion of the body and having an axial hole, and a valve rod extending through the axial hole of the cap, with the filler assembly adapted to be mounted in the axial hole of the cap, with the filler assembly adapted to seal a gap between the valve rod and an inner periphery of the axial hole, with the filler assembly comprising:

a plurality of first fillers, with each of the plurality of first fillers including upper and lower faces spaced from each other in a longitudinal direction, with a first through-hole extending from the upper face through the lower face of each of the plurality of first fillers, with each of the plurality of first fillers further including an outer periphery between the top face and the bottom face thereof, with the outer periphery of each of the plurality of first fillers free of holes, and with the valve rod adapted to extend through the first through-hole of each of the plurality of first fillers; and a plurality of second fillers, with each of the plurality of second fillers including top and bottom faces spaced from each other in the longitudinal direction, with a second through-hole extending from the top face through the bottom face of each of the plurality of second fillers, with each of the plurality of second fillers further including an outer periphery between the top face and the bottom face thereof, with the outer periphery of each of the plurality of second fillers free of holes, and with the valve rod adapted to extend through the second through-hole of each of the plurality of second fillers, with the plurality of first fillers and the plurality of second fillers stacked upon each other, with each of the plurality of second fillers located between two adjacent first fillers, with a groove defined in each of the top and bottom faces of each of the plurality of second fillers, with the groove in the top face of each of the plurality of second fillers having substantially V-shaped cross sections and extending across a whole area of the top face of one of the plurality of second fillers, with the groove in the bottom face of each of the plurality of second fillers having substantially inverted V-shaped cross sections and extending across a whole area of the bottom face of one of the plurality of second fillers, with at least one of the upper and lower faces of each of the plurality of first fillers being conic, and with the groove of each of the top and bottom faces of each of the plurality of second fillers receiving and contacting a whole area of one of the upper and lower faces of one of the plurality of first fillers that is conic, wherein when one of the plurality of first and second fillers is subjected to a pressing force in the longitudinal direction, at least one of the plurality of first and second fillers is moved in the radial direction, and the outer periphery of the at least one of the plurality of first and second fillers presses against an outer periphery of the valve rod.

2. The filler assembly as claimed in claim 1, with the upper face of each of the plurality of first fillers including at least one recess, with the at least one recess including a bottom face extending substantially perpendicularly to the longitudinal direction, with the at least one recess further including a peripheral wall extending from a peripheral edge of the bottom face of the at least one recess, with the peripheral edge of the at least one recess including a lip on a top portion of the at least one recess, and with a tool adapted to be inserted into the at least one recess and adapted to press against the lip for removing the plurality of first fillers out of the axial hole of the cap.

3. The filler assembly as claimed in claim 1, with the outer periphery of each of the plurality of first fillers including an annular groove, with the each of the plurality of first fillers including at least one notch extending from the upper face to the annular groove to be in communication with the annular groove, and with a tool adapted to be inserted into the annular groove via the at least one notch for removing the plurality of first fillers out of the axial hole of the cap.

4. The filler assembly as claimed in claim 1, with each of the plurality of first fillers being annular and made of metal, and with each of the plurality of second fillers being annular and made of graphite.

5. A filler assembly for a valve, with the valve including a body, a cap mounted to a top portion of the body and having an axial hole, and a valve rod extending through the axial hole of the cap, with the filler assembly adapted to be mounted in the axial hole of the cap, with the filler assembly adapted to seal a gap between the valve rod and an inner periphery of the axial hole, with the filler assembly comprising:

at least one first filler including upper and lower faces spaced from each other in a longitudinal direction, with a first through-hole extending from the upper face through the lower face of the at least one first filler, and with the valve rod adapted to extend through the first through-hole; and at least one second filler including top and bottom faces spaced from each other in the longitudinal direction, with a second through-hole extending from the top face through the bottom face of the at least one second filler, with the valve rod adapted to extend through the second through-hole, with the at least one second filler and the at least one first filler stacked upon each other and including two mutually facing and mutually abutting faces comprised of one of the upper and lower faces of the at least one first filler and one of the top and bottom faces of the at least one second filler, and with at least one of the two mutually facing and mutually abutting faces being a slant face at a non-parallel angle to a radial direction perpendicular to the longitudinal direction, with each of the at least one first filler and the at least one second filler adapted to press against the inner periphery of the axial hole of the cap when one of the at least one first filler and the at least one second filler is subjected to the pressing force in the longitudinal direction, with the upper face of the at least one first filler including at least one recess, with the at least one recess including a bottom face extending substantially perpendicularly to the longitudinal direction, with the at least one recess further including a peripheral wall extending from a peripheral edge of the bottom face of the at least one recess, with the peripheral edge of the at least one recess including a lip on a top portion of the at least one recess, and with a tool adapted to be inserted into the at least one recess and adapted to press against the lip for removing the at least one first filler out of the axial hole of the cap.

6. A filler assembly for a valve, with the valve including a body, a cap mounted to a top portion of the body and having an axial hole, and a valve rod extending through the axial hole of the cap, with the filler assembly adapted to be mounted in the axial hole of the cap, with the filler assembly adapted to seal a gap between the valve rod and an inner periphery of the axial hole, with the filler assembly comprising:

at least one first filler including upper and lower faces spaced from each other in a longitudinal direction, with a first through-hole extending from the upper face through the lower face of the at least one first filler, with the at least one first filler further including an outer periphery extending between the upper face and the lower face, and with the valve rod adapted to extend through the first through-hole; and at least one second filler including top and bottom faces spaced from each other in the longitudinal direction, with a second through-hole extending from the top face through the bottom face of the at least one second filler, with the valve rod adapted to extend through the second through-hole, and with the at least one second filler and the at least one first filler stacked upon each other and including two mutually facing and mutually abutting faces comprised of one of the upper and lower faces of the at least one first filler and one of the top and bottom faces of the at least one second filler, with each of the at least one first filler and the at least one second filler adapted to press against the inner periphery of the axial hole of the cap when one of the at least one first filler and the at least one second filler is subjected to the pressing force in the longitudinal direction, with the outer periphery of the at least one first filler including an annular groove, with the at least one first filler including at least one notch extending from the upper face to the annular groove to be in communication with the annular groove, and with a tool adapted to be inserted into the annular groove via the at least one notch for removing the at least one first filler out of the axial hole of the cap.

7. The filler assembly as claimed in claim 6, with the at least one first filler being annular and made of metal, and with the at least one second filler being annular and made of graphite.

8. The filler assembly as claimed in claim 6, with the at least one first filler including a plurality of first fillers, with the at least one second filler including a plurality of second fillers, and with each of the plurality of second fillers located between two adjacent first fillers.

9. The filler assembly as claimed in claim 8, with each of the plurality of first fillers being annular and made of metal, with each of the plurality of second fillers being annular and made of graphite, with the upper face of each of the plurality of first fillers being flat, with the lower face of each of the plurality of the first fillers being a slant face at the non-parallel angle to the radial direction, with the top face of each of the plurality of second fillers being a slant face at the non-parallel angle to the radial direction and abutting the lower face of one of the plurality of the first fillers, and with the bottom face of each of the plurality of second fillers being flat and abutting the upper face of one of the plurality of the first fillers.

10. The filler assembly as claimed in claim 8, with one of the top and bottom faces of each of the plurality of second fillers having a positive slope, with another of the top and bottom faces of each of the plurality of second fillers having a negative slope, and with each of the upper and lower faces of each of the plurality of first fillers having a slope corresponding to the positive slope or negative slope.

11. The filler assembly as claimed in claim 6, with the at least one first filler including a first filler, with the at least one second filler including a plurality of second fillers stacked below the first filler, with the first filler being annular and made of metal, with each of the plurality of second fillers being annular and made of graphite, with two mutually abutting faces of two adjacent second fillers comprised of the top face of a lower one of the two adjacent second fillers and the bottom face of an upper one of the two adjacent second fillers, and with at least one of the two mutually abutting faces of the two adjacent second fillers being a slant face at the non-parallel angle to the radial direction.

12. The filler assembly as claimed in claim 11, with the lower face of the first filler being a slant face, with each of the top and bottom faces of each of the plurality of second fillers being a slant face, with the top face of a topmost one of the plurality of second fillers abutting the lower face of the first filler, and with the bottom face of each of the plurality of second fillers abutting the top face of another of the plurality of second fillers.

* * * * *